United States Patent [19]
Horio et al.

[11] Patent Number: 6,147,146
[45] Date of Patent: Nov. 14, 2000

[54] RESIN COMPOSITION

[75] Inventors: Mitsuhiro Horio; Toshiharu Seyama, both of Kurashiki, Japan

[73] Assignee: Asahi Kasei Kogyo Kabushiki Kaisha, Osaka, Japan

[21] Appl. No.: 09/269,263

[22] PCT Filed: Nov. 13, 1997

[86] PCT No.: PCT/JP97/04141

§ 371 Date: Mar. 25, 1999

§ 102(e) Date: Mar. 25, 1999

[87] PCT Pub. No.: WO98/21280

PCT Pub. Date: May 22, 1998

[30] Foreign Application Priority Data

Nov. 13, 1996 [JP] Japan ................................ 8-301782

[51] Int. Cl.⁷ ........................... C08K 5/34; C08K 5/15; C08K 5/20; C08K 5/10; C08K 5/04
[52] U.S. Cl. .................... 524/100; 524/109; 524/223; 524/310; 524/400
[58] Field of Search ..................... 524/100, 109, 524/310, 400, 223

[56] References Cited

U.S. PATENT DOCUMENTS 5,191,006 3/1993 Matsumoto et al. ................ 524/319
5,519,075 5/1996 Matsumoto et al. ................ 524/100

FOREIGN PATENT DOCUMENTS

| | | |
|---|---|---|
| 0 289 142 A2 | 11/1988 | European Pat. Off. . |
| 0 853 098 A1 | 7/1998 | European Pat. Off. . |
| 50-52166 | 5/1975 | Japan . |
| 63-260949 | 10/1988 | Japan . |
| 2-166151 | 6/1990 | Japan . |
| 6-212054 | 8/1994 | Japan . |
| 7-324155 | 12/1995 | Japan . |
| 92/07033 | 4/1992 | WIPO . |
| 97/12937 | 10/1997 | WIPO . |

*Primary Examiner*—Kriellion Sanders
*Attorney, Agent, or Firm*—Birch, Stewart, Kolasch & Birch, LLP

[57] ABSTRACT

Disclosed are an oxymethylene polymer resin composition comprising an oxymethylene polymer, a sterically hindered phenol compound, a low-density polyethylene having a melt index of 0.2 to 100 g/10 minutes, a calcium salt of a fatty acid having 10 to 36 carbon atoms, wherein the calcium salt of a fatty acid has a calcium ion content of not larger than 50 ppm by weight and a chlorine ion content of not larger than 100 ppm by weight, and at least one formaldehyde-reactive substance selected from the group consisting of a non-polymeric compound containing a formaldehyde-reactive nitrogen atom and a polymer containing a formaldehyde-reactive nitrogen atom, and an extrusion molded article obtained from the above resin composition. The resin composition of the present invention is advantageous not only in that it has excellent extrusion moldability and exhibits excellent anti-slip properties when contacting the screw of an extruder during molding, but also in that an extrusion molded article produced therefrom has a remarkably reduced content of whitened portions and void portions comprising microvoids and hence has excellent mechanical properties and an excellent appearance.

17 Claims, No Drawings

RESIN COMPOSITION

This application is the national phase under 35 U.S.C. §371 of PCT International Application No. PCT/JP97/04141 which has an International filing date of Nov. 13, 1997 which designated the United States of America.

BACKGROUND OF THE INVENTION

1. Field of the Invention

The present invention relates to an oxymethylene polymer resin composition and an extrusion molded article thereof. More particularly, the present invention is concerned with an oxymethylene polymer resin composition comprising an oxymethylene polymer, a sterically hindered phenol compound, a low-density polyethylene, a calcium salt of a fatty acid having 10 to 36 carbon atoms, wherein the calcium salt has very low contents of calcium ions and chlorine ions which are derived from impurities, and a substance containing a formaldehyde-reactive nitrogen atom. The invention is also concerned with an extrusion molded article produced from the resin composition. The resin composition of the present invention is advantageous not only in that it has excellent extrusion moldability and exhibits excellent anti-slip properties when contacting the screw of an extruder during extrusion molding, but also in that an extrusion molded article produced therefrom has a remarkably reduced occurrence of whitened portions and void portions comprising microvoids and hence has excellent mechanical properties and an excellent appearance.

2. Prior Art

Oxymethylene polymers have been known as engineering plastics which have a good balance of mechanical properties and excellent moldability, and have been used in the production of a wide variety of articles, such as automobile parts, parts for electric and electronic equipment, industrial sundry goods, toys and the like. Among these articles, small-size and mass-produced articles are mainly made by an injection molding method. On the other hand, large-size articles and non-mass-produced articles are usually made by a method in which an oxymethylene polymer is subjected to extrusion molding, and the resultant extrusion molded article is subjected to secondary processing, such as cutting. Representative examples of articles produced by extrusion molding include a cylindrical bar having a diameter of from about 10 to 200 mm (hereinafter referred to as a "rod"), a sheet having a thickness of from about 10 to 100 mm (hereinafter referred to as a "large-thickness sheet"), and the like.

The inherent moldability of oxymethylene polymers is unsatisfactory for producing molded articles, such as a rod and a large-thickness sheet, by extrusion molding. Specifically, the obtained extrusion molded articles are disadvantageous in that they have an interior portion which exhibits a color tone different from that of the surrounding portions (such interior portion is hereinafter referred to as a "whitened portion") or they have an interior void portion comprising microvoids and the like. The occurrence of these whitened and void portions unfavorably leads to a lowering of not only mechanical properties but also the appearance of the molded articles. For example, when a screw is produced by cutting a rod (disadvantageously containing a void portion) which is produced from an oxymethylene polymer by extrusion molding, the mechanical strengths (such as flexural strength, tensile strength and impact strength) of the screw are reduced at the void portion therein, so that the screw is more likely to break under stress. Thus, it has been desired to reduce the occurrence of a whitened portion and a void portion in extrusion molded articles produced from oxymethylene polymers.

In order to improve the moldability of oxymethylene polymers, various attempts have been made. However, many of these attempts are intended to solve problems which accompany the injection molding of an oxymethylene polymer. Examples of these attempts include methods for improving mold release properties [see Unexamined Japanese Patent Application Laid-Open Specification No. 59-4641, Unexamined Japanese Patent Application Laid-Open Specification No. 60-104151, Unexamined Japanese Patent Application Laid-Open Specification No. 63-295661 (corresponding to U.S. Pat. No. 4,900,769) and Unexamined Japanese Patent Application Laid-Open Specification No. 4-100847 (corresponding to U.S. Pat. No. 5,187,218)]; methods for improving warpage resistance (see Unexamined Japanese Patent Application Laid-Open Specification No. 51-97652, Unexamined Japanese Patent Application Laid-Open Specification No. 55-16049, Unexamined Japanese Patent Application Laid-Open Specification No. 57-128740, Unexamined Japanese Patent Application Laid-Open Specification No. 60-104152, Unexamined Japanese Patent Application Laid-Open Specification No. 62-91551 and Unexamined Japanese Patent Application Laid-Open Specification No. 2-50948); and methods for improving shrinkage resistance (see Unexamined Japanese Patent Application Laid-Open Specification No. 4-100818 and Unexamined Japanese Patent Application Laid-Open Specification No. 4-100848). However, by these methods, the occurrence of whitened portions and void portions in extrusion molded articles cannot be satisfactorily prevented.

On the other hand, attempts have been made to obtain molded articles having various desired mechanical properties by molding a mixture of an oxymethylene polymer and a polyolefin. Examples of these attempts include a method for obtaining a fibrous article having improved stretching properties, in which use is made of a molding material obtained by adding a polyethylene to an oxymethylene polymer (see Examined Japanese Patent Application Publication No. 41-2730); a method in which use is made of a molding material obtained by adding a polyolefin resin to an oxymethylene polymer so as to increase the strength of the ultimate molded article (see Examined Japanese Patent Application Publication No. 42-19498); a method in which a composition comprising an oxymethylene polymer and a polybutene is used as a molding material (see Examined Japanese Patent Application Publication No. 43-20378), a method in which a composition comprising an oxymethylene polymer, an α-olefin polymer and a copolymer of ethylene and a vinyl monomer is used as a molding material (see Unexamined Japanese Patent Application Laid-Open Specification No. 49-40346); and a method in which a composition comprising a polyacetal, a polyethylene and a lubricant is used as a molding material [see Unexamined Japanese Patent Application Laid-Open Specification No.

49-104941 (corresponding to U.S. Pat. No. 4,051,096)]. Further, several attempts have been made in which use is made of a molding material obtained by adding a polyolefin, a sterically hindered phenol compound and the like to an oxymethylene polymer. For example, Unexamined Japanese Patent Application Laid-Open Specification No. 50-52166 discloses a Working Example in which use is made of a molding material obtained by mixing a polyoxymethylene diacetate with a fine powder of a low-density polyethylene, 2,2'-methylene-bis-(4-methyl-6-t-butylphenol), a copolyamide and isoeicosanol acetate; and Unexamined Japanese Patent Application Laid-Open Specification No. 50-103556 discloses a Working Example in which use is made of a molding material obtained by mixing a polyoxymethylene diacetate with a low-density polyethylene, 2,2'-methylene-bis-(4-methyl-6-t-butylphenol), a copolymer nylon and isostearyl alcohol, and polyethylene oxide. Unexamined Japanese Patent Application Laid-Open Specification No. 49-058145 (corresponding to U.S. Pat. No. 3,980,734) discloses the use of a thermoplastic molding material in which a polymer having a specific freezing temperature and a specific molecular weight is dispersed in a particulate form having a particle size of from 0.1 to 5 µm in a mixture of a linear polyoxymethylene and a network-structure polyoxymethylene, wherein the dispersed polymer is selected from an α-olefin homopolymer and an α-olefin copolymer. Unexamined Japanese Patent Application Laid-Open Specification No. 2-166151 discloses a composition comprising a polyoxymethylene, a sterically hindered phenol compound having a molecular weight of 300 or more, at least one substance selected from the group consisting of an alkali metal hydroxide, an alkaline earth metal hydroxide, an alkali metal salt of a carboxylic acid and an alkaline earth metal salt of a carboxylic acid, and a saponification product of a copolymer of ethylene and vinyl acetate. Further, Unexamined Japanese Patent Application Laid-Open Specification No. 6-207080 discloses a polyacetal resin molding material obtained by a method in which a polyolefin and additives (specifically a heat stabilizer, a heat aging resistance improver and a weathering resistance improver) are added to a polyacetal resin, and the resultant polyacetal resin composition is subjected to crystallization for a specific period of time. By these prior art techniques, an oxymethylene polymer can be improved with respect to abrasion resistance, impact resistance, stiffness, heat stability, dimensional stability and the like. However, in these prior art documents, there is no description suggesting that the prior art techniques can suppress the occurrence of whitened portions and void portions in extrusion molded articles. Further, these prior art techniques cannot satisfactorily prevent the occurrence of whitened portions and void portions in extrusion molded articles.

For preventing the occurrence of whitened portions and void portions in extrusion molded articles, Unexamined Japanese Patent Application Laid-Open Specification No. 6-212054 (corresponding to U.S. Pat. No. 5,519,075) proposes a composition comprising an oxymethylene polymer, a sterically hindered phenol compound, an olefin polymer resin, a polyalkylene glycol, a specific amide compound and melamine. This composition is improved in that the occurrence of whitened portions and void portions can be suppressed to some extent; however, the suppression is unsatisfactory. Further, due to the presence of a polyalkylene glycol in this composition, the composition is likely to slip on the screw of an extruder during extrusion molding, so that the extrusion molding of the composition cannot be efficiently performed, thus leading to a lowering of the productivity of desired extrusion molded articles.

Unexamined Japanese Patent Application Laid-Open Specification No. 7-324155 discloses a polyacetal resin composition containing a calcium salt of a fatty acid, wherein the calcium salt has a specific calcium ion content and a specific chlorine ion content. This composition is described to be improved in heat aging resistance, heat stability and mold deposit prevention. However, this prior art document has no description about an improvement in suppression of the occurrence of a whitened portion and a void portion in extrusion molded articles.

SUMMARY OF THE INVENTION

In this situation, the present inventors have made extensive and intensive studies with a view toward solving the above-mentioned problems accompanying the prior art. As a result, they have unexpectedly found that an oxymethylene polymer resin composition comprising an oxymethylene polymer, a sterically hindered phenol compound, a low-density polyethylene having a melt index of from 0.2 to 100 g/10 minutes, a calcium salt of a fatty acid having 10 to 36 carbon atoms, wherein the calcium salt of a fatty acid has a calcium ion content of not larger than 50 ppm by weight and a chlorine ion content of not larger than 100 ppm by weight, and a substance containing a formaldehyde-reactive nitrogen atom, has advantages not only in that it has excellent extrusion moldability and exhibits excellent anti-slip properties when contacting the screw of an extruder during molding, thus providing high productivity of desired extrusion molded articles, but also in that an extrusion molded article produced therefrom has a remarkably reduced occurrence of whitened portions and void portions comprising microvoids, wherein the reduction in the whitened and void portions is advantageous from the viewpoint of achieving good mechanical properties and a good appearance. Based on this finding, the present invention has been completed.

Therefore, it is an object of the present invention to provide a resin composition which is advantageous not only in that it has excellent extrusion moldability and exhibits excellent anti-slip properties when contacting the screw of an extruder during molding, but also in that an extrusion molded article produced therefrom has extremely reduced occurrence of whitened portions and void portions comprising microvoids. Hence, the resultant molded article has excellent mechanical properties and an excellent appearance.

It is another object of the present invention to provide an extrusion molded article obtained from the above-mentioned oxymethylene polymer resin composition and to provide a shaped article obtained by cutting the extrusion molded article.

The foregoing and other objects, features and advantages of the present invention will be apparent to those skilled in the art from the following detailed description and appended claims.

DETAILED DESCRIPTION OF THE INVENTION

According to the present invention, there is provided an oxymethylene polymer resin composition comprising:
- (A) 100 parts by weight of an oxymethylene polymer,
- (B) 0.05 to 2 parts by weight of a sterically hindered phenol compound,
- (C) 0.01 to 5 parts by weight of a low-density polyethylene having a melt index of from 0.2 to 100 g/10 minutes,
- (D) 0.01 to 1.0 part by weight of a calcium salt of a fatty acid having 10 to 36 carbon atoms, wherein the calcium salt of the fatty acid has a calcium ion content of not larger than 50 ppm by weight and a chlorine ion content of not larger than 100 ppm by weight, and
- (E) 0 to 2.0 parts by weight of at least one formaldehyde-reactive substance selected from the group consisting of a non-polymeric compound ($E_1$) containing a formaldehyde-reactive nitrogen atom and a polymer ($E_2$) containing a formaldehyde-reactive nitrogen atom.

For easy understanding of the present invention, the essential features and various preferred embodiments of the present invention are enumerated below.

1. An oxymethylene polymer resin composition comprising:
   - (A) 100 parts by weight of an oxymethylene polymer,
   - (B) 0.05 to 2 parts by weight of a sterically hindered phenol compound,
   - (C) 0.01 to 5 parts by weight of a low-density polyethylene having a melt index of from 0.2 to 100 g/10 minutes,
   - (D) 0.01 to 1.0 part by weight of a calcium salt of a fatty acid having 10 to 36 carbon atoms, wherein the calcium salt of the fatty acid has a calcium ion content of not larger than 50 ppm by weight and a chlorine ion content of not larger than 100 ppm by weight, and
   - (E) 0 to 2.0 parts by weight of at least one formaldehyde-reactive substance selected from the group consisting of a non-polymeric compound ($E_1$) containing a formaldehyde-reactive nitrogen atom and a polymer ($E_2$) containing a formaldehyde-reactive nitrogen atom.

2. The resin composition according to item 1 above, wherein the oxymethylene polymer (A) is at least one polymer selected from the group consisting of an oxy-methylene copolymer, a branched oxymethylene copolymer and a block copolymer of an oxymethylene copolymer.

3. The resin composition according to item 1 or 2 above, wherein the oxymethylene polymer (A) has a melt index of from 0.1 to 150 g/10 minutes.

4. The resin composition according to any one of items 1 to 3 above, wherein the hindered phenol compound (B) is at least one polymer selected from the group consisting of triethylene glycol-bis-[3-(3-t-butyl-5-methyl-4-hydroxyphenyl)-propionate], pentaerythrityl-tetrakis[3-(3,5-di-t-butyl-4-hydroxyphenyl)-propionate], N,N'-hexamethylene-bis(3,5-di-t-butyl-4-hydroxyhydrocinnamide), 1,6-hexanediol-bis-[3-(3,5-di-t-butyl-4-hydroxyphenyl)-propionate], and 3,9-bis-[2-{3-(3-t-butyl-4-hydroxy-5-methylphenyl)-propionyloxy}-1,1-dimethylethyl]-2,4,8,10-tetraoxaspiro(5,5)undecane.

5. The resin composition according to any one of items 1 to 4 above, wherein the hindered phenol compound (B) is present in an amount of from 0.1 to 1.0 part by weight, relative to 100 parts by weight of component (A).

6. The resin composition according to any one of items 1 to 5 above, wherein the low-density polyethylene (C) is at least one polyethylene selected from the group consisting of a high pressure low-density polyethylene and a linear low-density polyethylene.

7. The resin composition according to item 6 above, wherein the high pressure low-density polyethylene has a density of from 0.91 to 0.93 g/cm$^3$ and the linear low-density polyethylene has a density of from 0.88 to 0.93 g/cm$^3$.

8. The resin composition according to any one of items 1 to 7 above, wherein the low-density polyethylene (C) has a melt index of from 0.2 to 100 g/10 minutes.

9. The resin composition according to any one of items 1 to 8 above, wherein the low-density polyethylene (C) is present in an amount of from 0.01 to 3.0 parts by weight, relative to 100 parts by weight of component (A).

10. The resin composition according to any one of items 1 to 9 above, wherein the low-density polyethylene (C) is a high pressure low-density polyethylene.

11. The resin composition according to any one of items 1 to 10 above, wherein the calcium salt of fatty acid (D) is at least one calcium salt selected from the group consisting of calcium laurate, calcium stearate and acid calcium behenate.

12. The resin composition according to any one of items 1 to 11 above, wherein the calcium salt of fatty acid (D) is present in an amount of from 0.02 to 0.5 part by weight, relative to 100 parts by weight of component (A).

13. The resin composition according to any one of items 1 to 12 above, wherein:
   - the non-polymeric compound ($E_1$) containing a formaldehyde-reactive nitrogen atom is at least one compound selected from the group consisting of dicyandiamide and an amino-substituted triazine compound, and
   - the polymer ($E_2$) containing a formaldehyde-reactive nitrogen atom is at least one polymer selected from the group consisting of an amino-substituted triazine compound/formaldehyde polymer, a polyamide resin and an acrylamide polymer.

14. The resin composition according to item 13 above, wherein the amino-substituted triazine compound is melamine; the amino-substituted triazine compound/formaldehyde polymer is a melamine/formaldehyde polymer; and the acrylamide polymer is at least one polymer selected from the group consisting of a poly-β-alanine and a polyacrylamide.

15. The resin composition according to any one of items 1 to 14 above, wherein the formaldehyde-reactive substance (E) is present in an amount of from 0 to 1.0 part by weight, relative to 100 parts by weight of component (A).

16. An extrusion molded article obtained from the resin composition of item 1 above, which is a rod or a sheet.

17. A shaped article obtained by cutting the extrusion molded article of item 16 above.

The present invention will now be described below in detail.

In the present invention, examples of oxymethylene polymers used as component (A) include:
- (I) an oxymethylene homopolymer consisting essentially of oxymethylene units, which is obtained by polymerizing a formaldehyde monomer or a cyclic oligomer of formaldehyde, such as a formaldehyde trimer (trioxane) or a formaldehyde tetramer (tetraoxane);
- (II) an oxymethylene copolymer containing 0.1 to 20 % by weight of oxyalkylene units having 2 to 8 carbon atoms, which is obtained by copolymerizing a formaldehyde monomer or a cyclic oligomer of formaldehyde, such as trioxane or tetraoxane, with a cyclic ether, such as ethylene oxide, propylene oxide, epichlorohydrin, 1,3-dioxolane or a diglycol formal;

(III) a branched oxymethylene homopolymer obtained by polymerizing a formaldehyde monomer or a cyclic oligomer of formaldehyde, such as trioxane or tetraoxane, in the presence of a compound having, in a molecule thereof, a plurality of functional groups, such as hydroxyl groups, carboxyl groups, amino groups, acid anhydride groups, alkoxy groups and/or epoxy groups;

(IV) a branched oxymethylene copolymer obtained by copolymerizing a formaldehyde monomer or a cyclic oligomer of formaldehyde, such as trioxane or tetraoxane, with a cyclic ether, such as ethylene oxide, propylene oxide, epichlorohydrin, glycol formal or diglycol formal, in the presence of a compound having, in a molecule thereof, a plurality of functional groups, such as hydroxyl groups, carboxyl groups, amino groups, acid anhydride groups, alkoxy groups and/or epoxy groups;

(V) a block copolymer of an oxymethylene homopolymer, obtained by polymerizing a formaldehyde monomer or a cyclic oligomer of formaldehyde, such as trioxane or tetraoxane, in the presence of a styrene type, an ester type, an amide type or a urethane type elastomer having a functional group (such as a hydroxyl group, a carboxyl group, an amino group, an acid anhydride group, an alkoxy group or an epoxy group) at one end thereof or at both ends thereof; and (VI) a block copolymer of an oxymethylene copolymer, obtained by copolymerizing a formaldehyde monomer or a cyclic oligomer of formaldehyde, such as trioxane or tetraoxane, with a cyclic ether, such as ethylene oxide, propylene oxide, epichlorohydrin, glycol formal or diglycol formal, in the presence of a styrene type, an ester type, an amide type or a urethane type elastomer having a functional group (such as a hydroxyl group, a carboxyl group, an amino group, an acid anhydride group, an alkoxy group or an epoxy group) at one end thereof or at both ends thereof Of these oxymethylene polymers, an oxymethylene copolymer of item (II) above, a branched oxymethylene copolymer of item (IV) above and a block copolymer of an oxymethylene copolymer of item (VI) above are preferred. An oxymethylene copolymer of item (II) above is more preferred.

The melt index (MI) of the oxymethylene polymer used in the present invention is generally from 0.1 to 150 g/10 minutes, preferably from 1 to 100 g/10 minutes. With respect to a copolymer type polyoxymethylene polymer, the comonomer content thereof is generally from 0.1 to 20 mol, preferably from 0.3 to 10 mol, relative to 100 mol of the oxymethylene. In the present invention, the melt index is measured in accordance with ASTM-D1238-57T.

Examples of sterically hindered phenol compounds used as component (B) of the resin composition of the present invention include triethylene glycol-bis-[3-(3-t-butyl-5-methyl-4-hydroxyphenyl)-propionate], 1,6-hexanediol-bis-[3-(3,5-di-t-butyl-4-hydroxyphenyl)-propionate], pentaerythrityl-tetrakis[3-(3,5-di-t-butyl-4-hydroxyphenyl)-propionate], octadecyl-3-(3,5-di-t-butyl-4-hydroxyphenyl)-propionate], N,N'-hexamethylene-bis(3,5-di-t-butyl-4-hydroxy-hydrocinnamide), 3,5-di-t-butyl-4-hydroxy-benzylphosphonate-diethylester, 1,3,5-trimethyl-2,4,6-tris (3,5-di-t-butyl-4-hydroxybenzyl)benzene, 3,9-bis-[2-{3-(3-t-butyl-4-hydroxy-5-methylphenyl)-propionyloxy}-1,1-dimethylethyl]-2,4,8,10-tetraoxaspiro(5,5)undecane, 2,2'-methylene-bis(4-methyl-6-t-butylphenol), 2,2'-methylene-bis(4-ethyl-6-t-butylphenol), 1,1,3-tris(2-methyl-4-hydroxy-5-t-butylphenyl)butane, 1,6-hexanediol-bis-[3-(3-t-butyl-5-methyl-4-hydroxyphenyl)-propionate], pentaerythritol-tetrakis[3-(3-t-butyl-5-methyl-4-hydroxyphenyl)propionate], octadecyl-3-(3-t-butyl-5-methyl-4-hydroxyphenyl)propionate, N,N'-hexamethylene-bis(3-t-butyl-5-methyl-4-hydroxy-hydrocinnamide) and N,N'-bis-[3-(3,5-di-t-butyl-4-hydroxyphenol)propionyl]-hydrazine. Of these sterically hindered phenol compounds, triethylene glycol-bis-[3-(3-t-butyl-5-methyl-4-hydroxyphenyl)-propionate], pentaerythrityl-tetrakis[3-(3,5-di-t-butyl-4-hydroxyphenyl)-propionate], N,N'-hexamethylene-bis(3,5-di-t-butyl-4-hydroxy-hydrocinnamide), 1,6-hexanediol-bis-[3-(3,5-di-t-butyl-4-hydroxyphenyl)-propionate] and 3,9-bis-[2-{3-(3-t-butyl-4-hydroxy-5-methylphenyl)-propionyloxy}-1,1-dimethylethyl]-2,4,8,10-tetraoxaspiro(5,5)undecane are preferred. These sterically hindered phenol compounds can be used individually or in combination.

The amount of the sterically hindered phenol compound used in the present invention is generally in the range of from 0.05 to 2.0 parts by weight, preferably from 0.1 to 1.0 part by weight, relative to 100 parts by weight of the oxymethylene polymer as component (A). When the amount of the sterically hindered phenol compound is smaller than 0.05 part by weight, satisfactory heat resistance and extrusion moldability cannot be obtained. When the amount of the sterically hindered phenol compound is larger than 2.0 parts by weight, the resin composition is likely to suffer marked discoloration in a molding machine during molding, so that the resultant molded article is not suitable for practical use.

As the low-density polyethylene component (C) of the resin composition of the present invention, use can be made of at least one polyethylene selected from the group consisting of a high pressure low-density polyethylene and a linear low-density polyethylene.

A high pressure low-density polyethylene is produced by radical polymerization under a high pressure, namely a pressure in the range of from 1,000 to 3,000kg/cm$^2$. During the radical polymerization for producing a high pressure low-density polyethylene, short branchings (such as ethyl branching and butyl branching) from a main chain occur by an intramolecular hydrogen abstraction reaction due to "back biting". Due to the presence of the short branchings, the obtained high pressure polyethylene has a low density. Also, during the radical polymerization, long branchings occur due to an intermolecular hydrogen abstraction reaction, so that the high pressure low-density polyethylene is caused to have long branchings having a length comparable to that of a main chain. The density of the high pressure low-density polyethylene is generally in the range of from 0.91 to 0.93 g/cm$^3$.

A linear low-density polyethylene is produced by ionic polymerization. Specifically, a linear low-density polyethylene is produced by a method in which an ethylene monomer is copolymerized with an α-olefin, such as 1-butene, 1-hexene, 4-methylpentene-1 or 1-octene, which is employed in an amount of from several % to several tens % by weight, based on the weight of the ethylene monomer, thereby introducing short branchings into the main chain so as to decrease the density of the resultant polymer. The density of the linear low-density polyethylene is generally in the range of from 0.88 to 0.93 g/cm$^3$.

Elucidation has not yet been made with respect to the mechanism in which the low-density polyethylene in the resin composition of the present invention serves to decrease the occurrence of whitened portions and void portions in an extrusion molded article obtained from the resin composition. However, it has been found that, when the low-density polyethylene in the resin composition of the present invention is replaced by a high-density polyethylene (which has substantially no short branches and substantially no long branches), the effect of the present invention cannot be achieved. From this result, it is presumed that the effect of the present invention has some relationship to the branching structure of the low-density polyethylene in the resin composition. On the other hand, it has also been found that, as the low-density polyethylene component, a high pressure low-density polyethylene is more effective for achieving the effect of the present invention than a linear low-density polyethylene. Therefore, it is also believed that the presence of long branchings in the low-density polyethylene is advantageously very effective for achieving the effect of the present invention.

It is preferred that the low-density polyethylene has a melt index of from 0.2 to 100 g/10 minutes. It is more preferred that the low-density polyethylene has a melt index of from 0.4 to 90 g/10 minutes. When the melt index of the low-density polyethylene is smaller than 0.2 g/10 minutes, the suppression of the occurrence of whitened portions and void portions in an extrusion molded article is likely to become unsatisfactory. When the melt index of the low-density polyethylene is larger than 100 g/10 minutes, the occurrence of void portions is increased and the resin composition tends to slip on the screw of an extruder during molding.

The amount of the low-density polyethylene is in the range of from 0.01 to 5 parts by weight, preferably from 0.05 to 3 parts by weight, relative to 100 parts by weight of the oxymethylene polymer as component (A). When the amount of the low-density polyethylene is less than 0.01 part by weight, the suppression of the occurrence of whitened portions and void portions in an extrusion molded article is likely to become unsatisfactory. When the amount of the low-density polyethylene is more than 5 parts by weight, unfavorable exfoliation and internal fine cracking tend to occur in an extrusion molded article.

The calcium salt of a fatty acid, used as component (D) of the resin composition of the present invention, is a calcium salt of a saturated or unsaturated fatty acid having 10 to 36 carbon atoms. The fatty acid may be substituted with a hydroxyl group. Examples of saturated fatty acids include capric acid, lauric acid, myristic acid, palmitic acid, stearic acid, arachidic acid, behenic acid, lignoceric acid, cerotic acid, montanic acid, melissic acid and ceroplastic acid. Examples of unsaturated fatty acids include undecylenic acid, oleic acid, elaidic acid, cetoleic acid, erucic acid, brassidic acid, sorbic acid, linoleic acid, linolenic acid, arachidonic acid, propiolic acid and stearolic acid. Of these fatty acids, lauric acid, stearic acid and behenic acid are preferred.

The calcium salt of a fatty acid having 10 to 36 carbon atoms, which is used as component (D) of the resin composition of the present invention, is insoluble in water and methanol, and therefore produces no calcium ion. However, a calcium salt of a fatty acid having 10 to 36 carbon atoms is generally produced according to the below-described production process, and such calcium salt of a fatty acid generally contains both calcium ions and chlorine ions. The calcium ions are derived from, for example, $CaCl_2$, $Ca(OH)_2$ and the like, which are present as impurities, and the chlorine ions are derived from, for example, NaCl, $CaCl_2$ and the like, which are also present as impurities.

There is no particular limitation with respect to the method for producing the specific calcium salt of a fatty acid used in the present invention, as long as the obtained calcium salt of a fatty acid has a calcium ion content of substantially not larger than 50 ppm by weight and a chlorine ion content of substantially not larger than 100 ppm by weight. Specifically, for example, the calcium salt of a fatty acid used in the present invention can be obtained by a method in which a calcium salt of a fatty acid is produced by a reaction between a sodium salt of a fatty acid and calcium chloride. The obtained calcium salt of the fatty acid is repeatedly washed with water to remove calcium ions and chlorine ions until the calcium ion content and the chlorine ion content become 50 ppm by weight or less and 100 ppm by weight or less, respectively. The calcium salt of a fatty acid used in the present invention can also be obtained by a method in which a calcium salt of a fatty acid is produced by a reaction between a fatty acid and calcium hydroxide. The obtained calcium salt of the fatty acid is repeatedly washed with water to remove calcium ions and chlorine ions until the calcium ion content and the chlorine ion content become 50 ppm by weight or less and 100 ppm by weight or less, respectively. When calcium hydroxide having a low chlorine content is used for producing a calcium salt of a fatty acid, the number of washing operations necessary for obtaining the calcium salt of a fatty acid can be decreased. The calcium ion content and the chlorine ion content of a calcium salt of a fatty acid can be determined by ion chromatography. For example, a calcium salt of a fatty acid is added to a methanol/water mixture (weight ratio of 1:1), to thereby dissolve therein any soluble impurities. Thereafter, the resultant is subjected to ion chromatography for determination of calcium ions and chlorine ions, if any.

When the calcium ion content of component (D) is more than 50 ppm by weight and/or when the chlorine ion content of component (D) is more than 100 ppm by weight, problems arise not only in that the occurrence of whitened portions and void portions in an extrusion molded article is increased, but also in that discoloration tends to occur during the annealing of an extrusion molded article. Complete elucidation has not yet been made with respect to the reason why the occurrence of whitened portions and void portions in an extrusion molded article is increased when the calcium ion content requirement and/or the chlorine ion content requirement both defined in the present invention is not satisfied. However, it has been found that, when a comparison with respect to the number of spherulites (having a diameter of 100 μm or more) is made between an extrusion molded article produced from an oxmethylene polymer resin composition which satisfies both the above-mentioned calcium ion content and chlorine ion content requirements and an extrusion molded article produced from an oxmethylene polymer resin composition which does not satisfy any of the above-mentioned calcium ion content and chlorine ion content requirements, the number of spherulites in the former (satisfying both the above-mentioned calcium ion content and chlorine ion content requirements) is apparently smaller than the number of spherulites in the latter (not satisfying any of the above-mentioned calcium ion content and chlorine ion content requirements). From this finding, it is presumed that the number of crystal nuclei in the resin composition influences the solidification speed of the resin composition during molding and, in turn, the solidification speed affects the occurrence of a whitened portion and a void portion in the resultant molded article.

In the present invention, it is preferred that the calcium ion content and chlorine ion content of the calcium salt (D) of a fatty acid are as low as possible, most advantageously 0 ppm by weight.

The amount of the calcium salt (D) of a fatty acid is generally in the range of from 0.01 to 1.0 part by weight, preferably from 0.02 to 0.5 part by weight, relative to 100 parts by weight of the oxymethylene polymer.

When the amount of the calcium salt (D) of a fatty acid is smaller than 0.01 part by weight, the effect of component (D) for improving the heat resistance of the resin composition is unsatisfactory. When the amount of the calcium salt (D) of a fatty acid is larger than 1.0 part by weight, vigorous discoloration occurs during the annealing of an extrusion molded article.

As component (E) of the resin composition of the present invention, use is made of at least one formaldehyde-reactive substance selected from the group consisting of a non-polymeric compound ($E_1$) containing a formaldehyde-reactive nitrogen atom and a polymer ($E_2$) containing a formaldehyde-reactive nitrogen atom. The non-polymeric compound ($E_1$) is a monomeric compound or an oligomeric compound. Examples of non-polymeric compounds ($E_1$) include (1) dicyandiamide and (2) amino-substituted triazine compounds. Examples of amino-substituted triazine compounds (2) include guanamine (2,4-diamino-sym-triazine), melamine (2,4,6-triamino-sym-triazine), N-butylmelamine, N-phenylmelamine, N,N-diphenylmelamine, N,N-diallylmelamine, N,N',N"-triphenylmelamine, N-methylolmelamine, N,N'-dimethylolmelamine, N,N',N"-trimethylolmelamine, benzoguanamine (2,4-diamino-6-phenyl-sym-triazine), 2,4-diamino-6-methyl-sym-triazine, 2-4-diamino-6-butyl-sym-triazine, 2,4-diamino-6-benzyloxy-sym-triazine, 2,4-diamino-6-butoxy-sym-triazine, 2,4-diamino-6-cyclohexyl-sym-triazine, 2,4-diamino-6-chloro-sym-triazine, 2,4-diamino-6-mercapto-sym-triazine, 2,4-dioxy-6-amino-sym-triazine, 2-oxy-4,6-diamino-sym-triazine and N,N',N"-tetracyanoethylbenzoguanamine. Of these non-polymeric compounds ($E_1$), dicyandiamide and melamine are preferred.

On the other hand, examples of polymers ($E_2$) containing a formaldehyde-reactive nitrogen atom, which are usable as component (E) in the present invention, include (1) an amino-substituted triazine compound/formaldehyde polymer, (2) a polyamide resin, and (3) an acrylamide polymer. Examples of amino-substituted triazine/formaldehyde polymers include a melamine/formaldehyde polymer and the like. Examples of polyamide resins (2) include nylon 4-6, nylon 6, nylon 6-6, nylon 6-10, nylon 6-12, nylon 12 and the like, and copolyamides thereof, such as nylon 6/6-6, nylon 6/6-6/6-10, and nylon 6/6-12. Examples of acrylamide polymers (3) include a homopolymer obtained by polymerizing acrylamide or a derivative thereof in the presence of a metal alcoholate, a copolymer obtained by polymerizing acrylamide or a derivative thereof with another vinyl monomer in the presence of a metal alcoholate, a homopolymer obtained by polymerizing acrylamide or a derivative thereof in the presence of a radical polymerization catalyst, a copolymer obtained by polymerizing acrylamide or a derivative thereof with another vinyl monomer in the presence of a radical polymerization catalyst, and the like. Preferred examples of acrylamide polymers include poly-β-alanine and polyacrylamide. A poly-β-alanine can be produced in accordance with the methods disclosed in Examined Japanese Patent Application Publication Nos. 6-12259 corresponding to U.S. Pat. No. 5,015,707, 5-87096 and 5-47568 and Unexamined Japanese Patent Application Laid-Open Specification No. 3-234729. A homopolymer obtained by polymerizing acrylamide or a derivative thereof in the presence of a radical polymerization catalyst and a copolymer obtained by polymerizing acrylamide or a derivative thereof with another vinyl monomer in the presence of a radical polymerization catalyst can be produced in accordance with the method disclosed in Unexamined Japanese Patent Application Laid-Open Specification No. 3-28260.

The weight average molecular weight of the polymer ($E_2$) containing a formaldehyde-reactive nitrogen atom is preferably 500 or more, more preferably 5,000 or more.

The formaldehyde-reactive substance (E) of the resin composition of the present invention exhibits an effect of improving the heat resistance of the resin composition when the molding temperature is higher than usual or when the processing speed is very low.

The amount of the formaldehyde-reactive substance (E) in the resin composition of the present invention is 0 to 2.0 parts by weight, preferably 0 to 1.0 part by weight, relative to 100 parts by weight of the oxymethylene polymer as component (A). When the amount of the formaldehyde-reactive substance (E) is more than 2.0 parts by weight, the resin composition suffers discoloration during the residence of the composition in a molding machine.

In the present invention, various additives used for conventional oxymethylene polymers can be used. Examples of additives include a weathering stabilizer (for example, a light stabilizer), a lubricant (mold release agent), a pigment and the like. These additives can be used individually or in combination. These additives can be used in an amount usually employed in the art.

As light stabilizers, (I) a benzotriazole type compound, (II) an oxalic anilide type compound and (III) a hindered amine type compound are preferred.

Examples of benzotriazole type compounds (I) include 2-(2'-hydroxy-5'-methyl-phenyl)benzotriazole, 2-(2'- hydroxy-3,5-di-t-butyl-phenyl)benzotriazole, 2-(2'-hydroxy-3,5-di-isoamyl-phenyl)benzotriazole, 2-[2'-hydroxy-3,5-bis(α,α-dimethylbenzyl)phenyl]-2H-benzotriazole and 2-(2'-hydroxy-4'-octoxyphenyl) benzotriazole. Of these compounds, preferred are 2-[2'-hydroxy-3,5-bis(α,α-dimethylbenzyl)phenyl]-2H-benzotriazole and 2-(2'-hydroxy-3,5-di-t-butyl-phenyl) benzotriazole.

Examples of oxalic anilide type compounds (II) include 2-ethoxy-2'-ethyloxalic acid bisanilide, 2-ethoxy-5-t-butyl-2'-ethyloxalic acid bisanilide and 2-ethoxy-3'-dodecyloxalic acid bisanilide. These compounds can be used individually or in combination.

Examples of hindered amine type compounds (III) include 4-acetoxy-2,2,6,6, -tetramethylpiperidine, 4-stearoyloxy-2,2,6,6-tetramethylpiperidine, 4-acryloyloxy-2,2,6,6-tetramethylpiperidine, 4-(phenylacetoxy)-2,2,6,6-tetramethylpiperidine, 4-benzoyloxy-2,2,6,6-tetramethylpiperidine, 4-methoxy-2,2,6,6-tetramethylpiperidine, 4-stearyloxy-2,2,6,6-tetramethylpiperidine, 4-cyclohexyloxy-2,2,6,6-tetramethylpiperidine, 4-benzyloxy-2,2,6,6-tetramethylpiperidine, 4-phenoxy-2,2,6,6-tetramethylpiperidine, 4-(ethylcarbamoyloxy)-2,2,6,6-tetramethylpiperidine, 4-(cyclohexylcarbamoyloxy)-2,2,6,6-tetramethylpiperidine, 4-(phenylcarbamoyloxy)-2,2,6,6-tetramethylpiperidine, bis(2,2,6,6-tetramethyl-4-piperidyl)-carbonate, bis(2,2,6,6-tetramethyl-4-piperidyl)-oxalate, bis(2,2,6,6-tetramethyl-4-piperidyl)-malonate, bis(2,2,6,6-tetramethyl-4-piperidyl)-sebacate, bis(2,2,6,6-tetramethyl-4-piperidyl)-adipate, bis(2,2,6,6-tetramethyl-4-piperidyl)-terephthalate, 1,2-bis(2,2,6,6-tetramethyl-4-piperidyloxy)-ethane, α,α'-bis(2,2,6,6-tetramethyl-4-piperidyloxy)-p-xylene, bis(2,2,6,6-tetramethyl-4-piperidyl)tolylene-2,4-dicarbamate, bis(2,2,6,6-tetramethyl-4-piperidyl)-hexamethylene-1,6-dicarbamate, tris(2,2,6,6-tetramethyl-4-piperidyl)-benzene-1,3,5-tricarboxylate and tris(2,2,6,6-tetramethyl-4-piperidyl)-benzene-1,3,4-tricarboxylate. Of these compounds, bis(2,2,6,6-tetramethyl-4-piperidyl)-sebacate is preferred. The above-mentioned hindered amine type compounds can be used individually or in combination. A combination of a benzotriazole type compound (I), an oxalic anilide type compound (II) and a hindered amine type compound (III) is most preferred. In a combination of the compounds (I), (II) and (III), the proportionate amounts thereof can be arbitrarily selected. When the compounds (I), (II) and (III) are used in combination, the total amount of the compounds (I), (II) and (III) is generally in the range of from 0.01 to 3 parts by weight, relative to 100 parts by weight of the oxymethylene polymer as component (A).

Examples of lubricants (mold release agents) include an alcohol, a fatty acid, an ester obtained from an alcohol and a fatty acid, an ester obtained from an alcohol and a dicarboxylic acid, a fatty acid amide, a polyoxyalkylene glycol, an olefin compound having an average degree of polymerization of from 10 to 500, and silicone oil.

Examples of alcohols for use as lubricants (mold release agents) include both monohydric and polyhydric alcohols. Examples of monohydric alcohols include octyl alcohol, capryl alcohol, nonyl alcohol, decyl alcohol, undecyl alcohol, lauryl alcohol, tridecyl alcohol, myristyl alcohol, pentadecyl alcohol, cetyl alcohol, heptadecyl alcohol, stearyl alcohol, oleyl alcohol, nonadecyl alcohol, icosyl alcohol, behenyl alcohol, ceryl alcohol, melissyl alcohol, 2-hexyldecanol, 2-isoheptylundecanol, 2-octyldodecanol, 2-decyltetradecanol and 2-methylstearyl alcohol.

As polyhydric alcohols, those alcohols having 2 to 6 carbon atoms can be used. Examples of polyhydric alcohols include ethylene glycol, diethylene glycol, triethylene glycol, propylene glycol, dipropylene glycol, butanediol, pentanediol, hexanediol, glycerol, diglycerol, triglycerol, threitol, erythritol, pentaerythritol, arabitol, ribitol, xylitol, sorbitan, sorbitol and mannitol.

Examples of fatty acids as lubricants (mold release agents) include capric acid, lauric acid, myristic acid, palmitic acid, stearic acid, hydroxystearic acid, arachic acid, behenic acid, lignoceric acid, cerotic acid, montanic acid, melissic acid, ceroplastic acid, undecylenic acid, oleic acid, elaidic acid, cetoleic acid, erucic acid, brassidic acid, sorbic acid, linoleic acid, linolenic acid, arachidonic acid, propiolic acid and stearolic acid, natural fatty acids containing these fatty acids, and a mixture of these fatty acids. These aliphatic acids may or may not be substituted with a hydroxyl group.

Among esters obtained from an alcohol and a fatty acid, which are usable as lubricants (mold release agents), preferred is a fatty acid ester obtained by the reaction of a fatty acid selected from the group consisting of palmitic acid, stearic acid, behenic acid and montanic acid, with a polyhydric alcohol selected from the group consisting of glycerol, pentaerythritol, sorbitan and sorbitol. The fatty acid esters may or may not contain a hydroxyl group. For example, the fatty acid esters can be any of a monoester, a diester and a triester. Further, the fatty acid esters may contain a hydroxyl group which is blocked with boric acid or the like. Preferred examples of fatty acid esters include glycerol monopalmitate, glycerol dipalmitate, glycerol tripalmitate, glycerol monostearate, glycerol distearate, glycerol tristearate, glycerol monobehenate, glycerol dibehenate, glycerol tribehenate, glycerol monomontanate, glycerol dimontanate, glycerol trimontanate, pentaerythritol monopalmitate, pentaerythritol dipalmitate, pentaerythritol tripalmitate, pentaerythritol tetrapalmitate, pentaerythritol monostearate, pentaerythritol distearate, pentaerythritol tristearate, pentaerythritol tetrastearate, pentaerythritol monobehenate, pentaerythritol dibehenate, pentaerythritol tribehenate, pentaerythritol tetrabehenate, pentaerythritol monomontanate, pentaerythritol dimontanate, pentaerythritol trimontanate, pentaerythritol tetramontanate, sorbitan monopalmitate, sorbitan dipalmitate, sorbitan tripalmitate, sorbitan monostearate, sorbitan distearate, sorbitan tristearate, sorbitan monobehenate, sorbitan dibehenate, sorbitan tribehenate, sorbitan monomontanate, sorbitan dimontanate, sorbitan trimontanate, sorbitol monopalminate, sorbitol dipalminate, sorbitol tripalminate, sorbitol monostearate, sorbitol distearate, sorbitol tristearate, sorbitol monobehenate, sorbitol dibehenate, sorbitol tribehenate, sorbitol monomontanate, sorbitol dimontanate and sorbitol trimontanate. As an example of a fatty acid ester containing a hydroxyl group blocked with boric acid or the like, there can be mentioned a boric acid ester of a glycerol monoester of a fatty acid.

With respect to esters obtained from an alcohol and a dicarboxylic acid, which are usable as lubricants (mold release agents), examples of alcohols used for forming an ester with a dicarboxylic acid include saturated and unsaturated alcohols, such as methyl alcohol, ethyl alcohol, propyl alcohol, n-butyl alcohol, isobutyl alcohol, t-butyl alcohol, n-amyl alcohol, 2-pentanol, n-heptyl alcohol, n-octyl alcohol, n-nonyl alcohol, lauryl alcohol, myristyl alcohol, cetyl alcohol, stearyl alcohol and behenyl alcohol. Examples of dicarboxylic acids used for forming an ester with an alcohol include a monoester and a diester of oxalic acid, malonic acid, succinic acid, glutaric acid, adipic acid, pimelic acid, suberic acid, azelaic acid, sebacic acid, undecanoic acid, brassidic acid, maleic acid, fumaric acid and glutaconic acid.

As fatty acid amides usable as lubricants (mold release agents), there may be mentioned fatty acid amides obtained by reacting fatty acids having 16 or more carbon atoms with aliphatic amines or aliphatic diamines. Examples of fatty acids used for forming a fatty acid amide include palmitic acid, isopalmitic acid, stearic acid, isostearic acid, behenic acid, lignoceric acid, cerotic acid, heptacosanoic acid, montanic acid, melissic acid, lacceric acid, cetoleic acid and erucic acid. Examples of amines and diamines used for forming fatty acid amides include ammonia and ethylenediamine. Examples of fatty acid amides include stearyl amide, palmityl amide, oleyl amide, methylenebisstearamide, ethylenebisstearamide and ethylenebisoleyl amide.

Polyoxyalkylene glycols usable as lubricants (mold release agents) are classified into classes (I) to (III). The polyoxyalkylene glycols of class (I) are polycondensates of alkylene glycols. Examples of polyoxyalkylene glycols of class (I) include polyethylene glycol, polypropylene glycol, and a block polymer of polyethylene glycol and polypropylene glycol. The preferred degree of polymerization of these polyoxyalkylene glycols is in the range of from 5 to 1,000, more advantageously from 10 to 500. The polyoxyalkylene glycols of class (II) are ethers obtained from a polyoxyalkylene glycol of class (I) and an aliphatic alcohol. Examples of polyoxyalkylene glycols of class (II) include polyethylene glycol oleyl ether (degree of polymerization of ethylene oxide: 5 to 50), polyethylene glycol cetyl ether (degree of polymerization of ethylene oxide: 5 to 20), polyethylene glycol stearyl ether (degree of polymerization of ethylene oxide: 5 to 30), polyethylene glycol lauryl ether (degree of polymerization of ethylene oxide: 5 to 30), polyethylene glycol tridecyl ether (degree of polymerization of ethylene oxide: 5 to 30), polyethylene glycol nonyl phenyl ether (degree of polymerization of ethylene oxide: 2 to 100) and polyethylene glycol octyl phenyl ether (degree of polymerization of ethylene oxide: 4 to 50). The polyoxyalkylene glycols of class (III) are esters obtained from a polyoxyalkylene glycol of class (I) and a higher fatty acid. Examples of polyoxyalkylene glycols of class (III) include polyethylene glycol monolaurate (degree of polymerization of ethylene oxide: 2 to 30), polyethylene glycol monostearate (degree of polymerization of ethylene oxide: 2 to 50) and polyethylene glycol monooleate (degree of polymerization of ethylene oxide: 2 to 10).

The olefin compound having an average degree of polymerization of from 10 to 500, which is usable as a lubricant (mold release agent), is represented by the following formula (1):

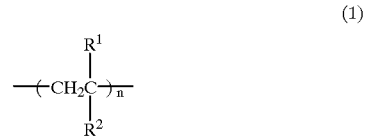

wherein each of $R^1$ and $R^2$ independently represents a hydrogen atom, an alkyl group, an aryl group or an alkoxy group, and n represents an average degree of polymerization and is from 10 to 500.

Examples of alkyl groups include an ethyl group, a propyl group, a butyl group, a hexyl group, an octyl group, a decyl group, a lauryl group, a cetyl group and a stearyl group. Examples of aryl groups include a phenyl group, a p-butylphenyl group, a p-octylphenyl group, a p-nonylphenyl group, a benzyl group, a p-butylbenzyl group, a tolyl group and a xylyl group. Examples of ether groups include an ethoxy group, a propyloxy group and a butyloxy group. Examples of monomers used for producing an olefin compound include olefin monomers, such as ethylene, propylene, 1-butene, 2-butene, isobutylene, 1-pentene, 2-pentene, 2-methyl-1-butene, 3-methyl-1-butene, 2-methyl-2-butene, 1-hexene, 2,3-dimethyl-2-butene, 1-heptene, 1-octene, 1-nonene and 1-decene, and diolefin monomers, such as allene, 1,2-butadiene, 1,3-butadiene, 1,3-pentadiene, 1,4-pentadiene, 1,5-hexadiene and cyclopentadiene. Alternatively, the olefin compound may be a copolymer obtained by copolymerizing 2 or more types of monomers selected from these olefin and diolefin monomers. When the olefin compound is obtained by polymerizing a diolefin monomer, from the viewpoint of increasing the heat stability of the olefin compound, it is preferred to use a modified olefin compound which is obtained by subjecting the olefin compound to a conventional hydrogenation treatment so as to decrease the number of carbon-carbon unsaturated bonds in the olefin compound to a number as small as possible.

It is necessary that the average degree of polymerization (n) of olefin monomer units constituting the olefin compound be in the range of from 10 to 500, preferably from 15 to 300. When the average degree (n) of polymerization is less than 10, the long-term lubrication properties of the olefin compound tend to become low and mold deposit problems tend to occur. When the average degree of polymerization (n) is more than 500, the initial lubrication properties of the olefin compound tend to become low.

As preferred examples of silicone oils usable as lubricants (mold release agents), there can be mentioned polydimethyl siloxane and polymethyl phenyl siloxane, both represented by the following formula (2):

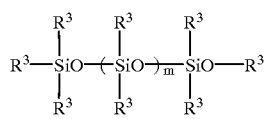

(2)

wherein each $R^3$ independently represents a methyl group, an alkyl group, a phenyl group, a halogenated alkyl group, a halogenated phenyl group, a polyalkylene glycol and the like, provided that at least one $R^3$ is a methyl group; and m represents an average degree of polymerization and is a positive integer.

As a silicone oil, there can also be employed a modified polyorganosiloxane having a structure in which some methyl groups of the dimethylsiloxane units are replaced by other groups, such as a halogenated phenyl group (e.g., a chlorophenyl group), an alkyl group having 8 or more carbon atoms, a polyethylene glycol-containing group, a higher fatty acid ester group derived from a fatty acid having 8 or more carbon atoms, or a halogenated alkyl group (e.g., a trifluoromethyl group). It is preferred that the silicone oil has a kinematic viscosity of from 100 to 100,000 cSt, as measured at 25° C.

Generally, the amount of the lubricant (mold release agent) is 0.05 to 3 parts by weight, relative to 100 parts by weight of the oxymethylene polymer as component (A). When the amount of the lubricant is too large, the resin composition tends to exhibit poor anti-slip properties when contacting the screw of an extruder during extrusion molding, so that the efficiency of the extrusion molding becomes low. Therefore, the amount of the lubricant should be appropriately selected so that the excellent anti-slip properties of the resin composition of the present invention are not impaired.

Examples of pigments include organic pigments and inorganic pigments. As inorganic pigments, there can be mentioned inorganic pigments conventionally used for the coloring of resins. Examples of inorganic pigments include zinc sulfide, zinc oxide, titanium oxide, barium sulfate, Titan Yellow, iron oxide, ultramarine, cobalt blue, calcined pigments, carbonate, phosphate, acetate, carbon black, acetylene black, lamp black and the like. Examples of organic pigments include a condensed azo type, an isoindoline type, a disazo type, a monoazo type, an anthraquinone type, a heterocyclic type, a quinacridone type, a thioindigo type, a perylene type, a dioxazine type, a phthalocyanine type and the like. These pigments can be used in an amount usually employed in the art.

With respect to the method for preparing the oxymethylene polymer resin composition of the present invention, there is no particular limitation. For example, the resin composition of the present invention can be prepared by a method in which the components for the resin composition are separately or simultaneously fed into and melt-kneaded in a kneader, a single-screw extruder, a twin-screw extruder or the like. Before the feeding of the components into a kneader, an extruder or the like, all or some of the components may be preliminarily blended with one another or each other uniformly, using a Henschel mixer, a blender or the like. The preferred temperature for the melt kneading is from 180° C. to 240° C.

The extrusion molded article of the present invention can be obtained, for example, by using an apparatus having a structure in which a desired die is connected to a conventional, single- or twin-screw extruder, and a support roller or the like for supporting the extrusion molded article being produced is set near the opening of the die. The obtained extrusion molded article is subjected to annealing at about 40° C. for about 24 hours, and then the resultant annealed product is subjected to cutting by means of various machining tools, thereby obtaining a shaped article.

The resin composition of the present invention has advantages not only in that it has excellent extrusion moldability, but also in that extrusion molded articles produced therefrom have a remarkably reduced occurrence of whitened portions and void portions comprising microvoids, wherein the reduction in the whitened and void portions is advantageous from the viewpoint of achieving good mechanical properties and good appearance.

BEST MODE FOR CARRYING OUT THE INVENTION

The present invention will now be further illustrated in more detail with reference to the following Examples and Comparative Examples, which should not be construed as limiting the scope of the present invention.

In the following Examples and Comparative Examples, the below-mentioned components were employed. Further, various properties were evaluated by the below-mentioned methods.

[Components employed]
A. Oxymethylene polymer
   A-1: oxymethylene copolymer having a melt index (MI) of 2.5 g/10 minutes,
B. Sterically hindered phenol
   B-1: triethylene glycol-bis-[3-(3-t-butyl-5-methyl-4-hydroxyphenyl)-propionate],
   B-2: pentaerythrithyl-tetrakis[3-(3,5-di-t-butyl-4-hydroxyphenyl)propionate],
   B-3: 3,9-bis[2-{3-(3-t-butyl-4-hydroxy-5-methylphenyl)propionyloxy}-1,1-dimethylethyl]- 2,4,8,10-tetraoxaspiro(5,5)undecane,
C. Polyethylene
   C-1: high pressure low-density polyethylene (manufactured and sold by Asahi Kasei Kogyo Kabushiki Kaisha, Japan); melt index (MI)=7 g/10 minutes, density=0.92 g/cm$^3$,
   C-2: high pressure low-density polyethylene (manufactured and sold by Asahi Kasei Kogyo Kabushiki Kaisha, Japan); MI=0.5 g/10 minutes, density=0.92 g/cm$^3$,
   C-3: high pressure low-density polyethylene (manufactured and sold by Asahi Kasei Kogyo Kabushiki Kaisha, Japan); MI=15 g/10 minutes, density=0.92 g/cm$^3$,
   C-4: high pressure low-density polyethylene (manufactured and sold by Asahi Kasei Kogyo Kabushiki Kaisha, Japan); MI=90 g/10 minutes, density=0.92 g/cm$^3$,
   C-5: high pressure low-density polyethylene (manufactured and sold by Asahi Kasei Kogyo Kabushiki Kaisha, Japan); MI=0.1 g/10 minutes, density=0.92 g/cm$^3$, C-6: high pressure low-density polyethylene (manufactured and sold by Asahi Kasei Kogyo Kabushiki Kaisha, Japan); MI=120 g/10 minutes, density=0.91 g/cm$^3$, C-7; linear low-density polyethylene (manufactured and sold by Asahi Kasei Kogyo Kabushiki Kaisha, Japan); MI=0.5 g/10 minutes, density=0.92 g/cm$^3$, C-8: linear low-density polyethylene (manufactured and sold by Asahi Kasei Kogyo Kabushiki Kaisha, Japan); MI=9 g/10 minutes, density=0.92 g/cm$^3$, C-9: linear low-density polyethylene (manufactured and sold by Asahi Kasei Kogyo Kabushiki Kaisha, Japan); MI=16 g/10 minutes, density=0.92 g/cm$^3$, C-10: high density polyethylene (manufactured and sold by Asahi Kasei Kogyo Kabushiki Kaisha, Japan); MI=7 g/10 minutes, density=0.96 g/cm$^3$, and C-11: high density polyethylene (manufactured and sold by Asahi Kasei Kogyo Kabushiki Kaisha, Japan); MI=15 g/10 minutes, density=0.95 g/cm$^3$.

D. Calcium salt of a fatty acid

D-1: calcium stearate having a calcium ion content of 11 ppm and a chlorine ion content of 20 ppm, D-2: calcium stearate having a calcium ion content of 110 ppm and a chlorine ion content of 160 ppm, D-3: calcium laurate having a calcium ion content of 21 ppm and a chlorine ion content of 22 ppm, and D-4: calcium laurate having a calcium ion content of 120 ppm and a chlorine ion content of 120 ppm.

E. Formaldehyde-reactive substance

E-1: melamine,

E-2: dicyandiamide, and

E-3; nylon 6,6.

F. Other components

F-1: polyethylene glycol (number average molecular weight=1,000), and

F-2: ethylene bisstearyl amide.

[Methods for evaluation of properties]

(1) Evaluation of the Extrusion Moldability of a Resin Composition with Respect to the Production of a Rod (hereinafter referred to as "extrusion moldability for rod production"):

Extrusion moldability for rod production was evaluated by examining the size of a void portion, the extent of the occurrence of a whitened portion (hereinafter frequently referred to as "degree of whitening"), and the anti-slip properties of the resin composition which are exhibited when the resin composition contacts the screw of an extruder.

Specifically, the pellets obtained in each of the Examples and Comparative Examples were dried with hot air at 80° C. for 3 hours. The resultant dried pellets were subjected to extrusion molding under a resin pressure of 15 kg/cm$^2$, by using a single-screw extruder having an L/D ratio of 25 and a diameter of 30 mm and having a cylinder temperature of 180° C., wherein the extruder had, connected to the forward end thereof, a die for extrusion molding a rod (the die had a length of 1 m and an inner diameter of 140 mm and had a temperature of 20° C.), to thereby obtain a 2.5 m length rod-shaped article (i.e., a rod). In the extrusion molding, the screw revolution rate of the extruder was adjusted so that the molding rate of the rod became 300 mm/hr (the lower the screw revolution rate required for achieving a certain molding rate, the more excellent the anti-slip properties of the resin composition which are exhibited when the resin composition contacts the screw of an extruder). Ten disc-shaped cross-sectional samples each having a 10 mm thickness were cut out from ten portions of the rod, the ten portions being present at 5 cm intervals along the length of the rod within a region thereof between two points which were respectively 0.5 m and 1.5 m apart from the forward end of the rod. Then, the size (in millimeters) of the diameter of a void portion at the center of each sample was measured, and the degree of whitening was evaluated by using a standard plate for evaluation of whitening in six degrees "0", "1", "2", "3", "4" and "5" (wherein the evaluation "0" indicates that there is no whitening, and the evaluation "5" indicates that whitening is observed over an area having a diameter which is about half of the diameter of the sample, and wherein the remaining evaluations from "1" to "4" are assigned to four degrees obtained by dividing the intermediate magnitude which is greater than "0" but is smaller than "5". With respect to the evaluation of each of the size of a void portion and the degree of whitening, average values taken with respect to the 10 samples are shown.

(2) Evaluation of the Occurrence of Exfoliation

The surface of an extrusion molded rod and a surface of the rod exposed by cutting the rod were visually observed so as to determine whether or not an exfoliation occurred.

(3) Number of Spherulites in a Rod

The number of spherulites in a rod was counted as follows.

A square sample having a size of 2 mm×2 mm×10 μm (thickness) was cut out from a disc-shaped sample used for the evaluation of extrusion moldability, wherein the cutting was conducted so that the thicknesswise direction of the square sample became the same as the thicknesswise direction of the original disc-shaped sample and hence corresponded to the flow direction of the resin during the molding. The obtained square sample was observed by means of a polarizing microscope so as to count the number of spherulites having a diameter of 100 μm or more.

EXAMPLE 1

100 parts by weight of oxymethylene copolymer A-1, 0.3 part by weight of sterically hindered phenol B-1, 0.2 part by weight of polyethylene C-1 and 0.05 part by weight of calcium stearate D-1 were blended together in a Henschel mixer, and the resultant blend was melt-kneaded and extruded by means of a twin-screw extruder having an L/D ratio of 30 and a diameter of 40 mm, under conditions that the cylinder temperature was 210° C., the revolution rate of the screw was 100 rpm and the discharge rate was 30 kg/hour. The extruded molten strands were cooled and pelletized, thereby obtaining pellets. With respect to the thus obtained pellets, an extrusion molding test was carried out. The results are shown in Table 1.

EXAMPLES 2 to 4

Substantially the same procedure as in Example 1 was repeated except that the polyethylenes indicated in Table 1 were used instead of polyethylene C-1. The results are shown in Table 1.

Comparative Examples 1 and 2

Substantially the same procedure as in Example 1 was repeated except that the polyethylenes indicated in Table 1 were used instead of polyethylene C-1. The results are shown in Table 1.

Comparative Example 3

Substantially the same procedure as in Example 1 was repeated except that calcium stearate D-2 was used instead of calcium stearate D-1. The results are shown in Table 1.

Comparative Example 4

Substantially the same procedure as in Example 1 was repeated except that polyethylene C-1 was not used. The results are shown in Table 1.

Comparative Examples 5 and 6

Substantially the same procedure as in Example 1 was repeated except that the amount of polyethylene C-1 was changed as indicated in Table 1. The results are shown in Table 1.

EXAMPLES 5 and 6

Substantially the same procedure as in Example 1 was repeated except that the amount of polyethylene C-1 was changed as indicated in Table 1. The results are shown in Table 1.

EXAMPLES 7 to 9

Substantially the same procedure as in Example 1 was repeated except that the polyethylenes indicated in Table 2 were used instead of polyethylene C-1. The results are shown in Table 2.

Comparative Examples 7 and 8

Substantially the same procedure as in Example 1 was repeated except that the polyethylenes indicated in Table 2 were used instead of polyethylene C-1. The results are shown in Table 2.

Comparative Example 9

Substantially the same procedure as in Example 8 was repeated except that calcium stearate D-2 was used instead of calcium stearate D-1. The results are shown in Table 2.

EXAMPLE 10

100 parts by weight of oxymethylene copolymer A-1, 0.3 part by weight of sterically hindered phenol B-1, 0.3 part by weight of polyethylene C-8 and 0.1 part by weight of calcium stearate D-1 were blended together in a Henschel mixer, and the resultant blend was melt-kneaded and extruded by means of a twin-screw extruder having an L/D ratio of 30 and a diameter of 40 mm, under conditions that the cylinder temperature was 210° C., the revolution rate of the screw was 100 rpm and the discharge rate was 30 kg/hour. The extruded molten strands were cooled and pelletized, thereby obtaining pellets. With respect to the thus obtained pellets, an extrusion molding test was carried out. The results are shown in Table 2.

EXAMPLES 11 and 12

Substantially the same procedure as in Example 1 was repeated except that the sterically hindered phenols indicated in Table 2 were used instead of sterically hindered phenol B-1. The results are shown in Table 2.

EXAMPLE 13

100 parts by weight of oxymethylene copolymer A-1, 0.3 part by weight of sterically hindered phenol B-1, 0.3 part by weight of polyethylene C-3 and 0.1 part by weight of calcium laurate D-3 were blended together in a Henschel mixer, and the resultant blend was melt-kneaded by means of a twin-screw extruder having an L/D ratio of 30 and a diameter of 40 mm, under conditions that the cylinder temperature was 210° C., the revolution rate of the screw was 100 rpm and the discharge rate was 30 kg/hour. The extruded molten strands were cooled and pelletized, thereby obtaining pellets. With respect to the thus obtained pellets, an extrusion molding test was carried out. The results are shown in Table 2.

Comparative Example 10

Substantially the same procedure as in Example 13 was repeated except that calcium laurate D-4 was used instead of calcium laurate D-3. The results are shown in Table 2.

EXAMPLE 14

100 parts by weight of oxymethylene copolymer A-1, 0.3 part by weight of sterically hindered phenol B-1, 0.2 part by weight of polyethylene C-3, 0.05 part by weight of calcium stearate D-1 and 0.05 part by weight of melamine E-1 were blended together in a Henschel mixer, and the resultant blend was melt-kneaded and extruded by means of a twin-screw extruder having an L/D ratio of 30 and a diameter of 40 mm, under conditions that the cylinder temperature was 210° C., the revolution rate of the screw was 100 rpm and the discharge rate was 30 kg/hour. The extruded molten strands were cooled and pelletized, thereby obtaining pellets. With respect to the thus obtained pellets, an extrusion molding test was carried out. The results are shown in Table 3.

EXAMPLES 15 and 16

Substantially the same procedure as in Example 14 was repeated except that the formaldehyde-reactive substances indicated in Table 3 were used instead of melamine E-1. The results are shown in Table 3.

Comparative Example 11

100 parts by weight of oxymethylene copolymer A-1, 0.3 part by weight of sterically hindered phenol B-1, 0.2 part by weight of polyethylene C-1, 0.05 part by weight of calcium stearate D-1 and 0.5 part by weight of polyethylene glycol F-1 were blended together in a Henschel mixer, and the resultant blend was melt-kneaded and extruded by means of a twin-screw extruder having an L/D ratio of 30 and a diameter of 40 mm, under conditions that the cylinder temperature was 210° C., the revolution rate of the screw was 100 rpm and the discharge rate was 30 kg/hour. The extruded molten strands were cooled and pelletized, thereby obtaining pellets. With respect to the thus obtained pellets, an extrusion molding test was carried out. The results are shown in Table 3.

Comparative Example 12

100 parts by weight of oxymethylene copolymer A-1, 0.3 part by weight of sterically hindered phenol B-1, 0.2 part by weight of polyethylene C-1, 0.05 part by weight of melamine E-1, 0.5 part by weight of polyethylene glycol F-1 and 0.1 part by weight of ethylene bisstearyl amide F-2 were blended together in a Henschel mixer, and the resultant blend was melt-kneaded and extruded by means of a twin-screw extruder having an L/D ratio of 30 and a diameter of 40 mm, under conditions that the cylinder temperature was 210° C., the revolution rate of the screw was 100 rpm and the discharge rate was 30 kg/hour. The extruded molten strands were cooled and pelletized, thereby obtaining pellets. With respect to the thus obtained pellets, an extrusion molding test was carried out. The results are shown in Table 3.

TABLE 1

| | | Example-1 | Example-2 | Example-3 | Example-4 | Comparative Example-1 | Comparative Example-2 | Comparative Example-3 | Comparative Example-4 | Comparative Example-5 | Example-5 | Example-6 | Comparative Example-6 |
|---|---|---|---|---|---|---|---|---|---|---|---|---|---|
| Oxymethylene copolymer | A-1 | 100 | 100 | 100 | 100 | 100 | 100 | 100 | 100 | 100 | 100 | 100 | 100 |
| Hindered phenol | B-1 | 0.3 | 0.3 | 0.3 | 0.3 | 0.3 | 0.3 | 0.3 | 0.3 | 0.3 | 0.3 | 0.3 | 0.3 |
| | B-2 | | | | | | | | | | | | |
| | B-3 | | | | | | | | | | | | |
| Polyethylene | C-1 | 0.2 | | | | | | | | | | | |
| | C-2 | | 0.2 | | | | | | | | | | |
| | C-3 | | | 0.2 | | | | | | | | | |
| | C-4 | | | | 0.2 | | | | | | | | |
| | C-5 | | | | | 0.2 | | | | | | | |
| | C-6 | | | | | | 0.2 | | | | | | |
| | C-7 | | | | | | | 0.2 | | | | | |
| | C-8 | | | | | | | | 0 | 0.005 | 1.0 | 2.0 | 6.0 |
| | C-9 | | | | | | | | | | | | |
| | C-10 | | | | | | | | | | | | |
| | C-11 | | | | | | | | | | | | |
| Calcium salt of a fatty acid | D-1 | 0.05 | 0.05 | 0.05 | 0.05 | 0.05 | 0.05 | | 0.05 | 0.05 | 0.05 | 0.05 | 0.05 |
| | D-2 | | | | | | | 0.05 | | | | | |
| | D-3 | | | | | | | | | | | | |
| | D-4 | | | | | | | | | | | | |
| Formaldehyde-reactive substance | E-1 | | | | | | | | | | | | |
| | E-2 | | | | | | | | | | | | |
| | E-3 | | | | | | | | | | | | |
| Others | F-1 | | | | | | | | | | | | |
| | F-2 | | | | | | | | | | | | |
| Moldability for rod production | Size of void portion (mm) | 2.5 | 2.8 | 2.3 | 2.7 | 4.5 | 4.2 | 4.3 | 6.0 | 5.2 | 2.2 | 2.1 | 1.9 |
| | Degree of whitening | 2.8 | 3.0 | 2.5 | 2.5 | 4.6 | 3.2 | 4.7 | >5 | >5 | 3.0 | 3.8 | >5 |
| | Screw revolution rate of extruder (rpm) | 30 | 30 | 30 | 30 | 30 | 35 | 30 | 30 | 30 | 30 | 30 | 30 |
| Exfoliation of molded article | | None | None | None | None | None | None | None | None | None | None | None | Observed |
| Number of spherulites in rod | | 7 | 7 | 6 | 6 | 16 | 15 | 15 | 45 | 31 | 6 | 6 | 6 |

TABLE 2

| | | Example-7 | Example-8 | Example-9 | Comparative Example-7 | Comparative Example-8 | Comparative Example-9 | Example-10 | Example-11 | Example-12 | Example-13 | Comparative Example-10 |
|---|---|---|---|---|---|---|---|---|---|---|---|---|
| Oxymethylene copolymer | A-1 | 100 | 100 | 100 | 100 | 100 | 100 | 100 | 100 | 100 | 100 | 100 |
| Hindered phenol | B-1 | 0.3 | 0.3 | 0.3 | 0.3 | 0.3 | 0.3 | 0.3 | | | 0.3 | 0.3 |
| | B-2 | | | | | | | | 0.3 | 0.3 | | |
| | B-3 | | | | | | | | | 0.2 | | |
| Polyethylene | C-1 | | | | | | | | | | | |
| | C-2 | | | | | | | | | | | |
| | C-3 | | | | | | | | 0.2 | | 0.3 | 0.3 |
| | C-4 | | | | | | | | | 0.2 | | |
| | C-5 | | | | | | | | | | | |
| | C-6 | | | | | | | | | | | |
| | C-7 | 0.2 | | | | | | | | | | |
| | C-8 | | 0.2 | | | 0.2 | 0.2 | 0.3 | | | | |
| | C-9 | | | 0.2 | | | | | | | | |
| | C-10 | | | | 0.2 | | | | | | | |
| | C-11 | | | | | 0.2 | | | | | | |
| Calcium salt of a fatty acid | D-1 | 0.05 | 0.05 | 0.05 | 0.05 | 0.05 | | 0.1 | 0.05 | 0.05 | | |
| | D-2 | | | | | | 0.05 | | | | | |
| | D-3 | | | | | | | | | | | |
| | D-4 | | | | | | | | | | 0.1 | 0.1 |
| Formaldehyde-reactive substance | E-1 | | | | | | | | | | | |
| | E-2 | | | | | | | | | | | |
| | E-3 | | | | | | | | | | | |
| Others | F-1 | | | | | | | | | | | |
| | F-2 | | | | | | | | | | | |
| Moldability for rod production | Size of void portion (mm) | 3.2 | 3.4 | 3.2 | 4.6 | 4.8 | 4.8 | 2.8 | 2.3 | 2.5 | 2.3 | 4.5 |
| | Degree of whitening | 3.0 | 3.2 | 2.9 | 4.3 | 4.5 | 4.5 | 3.0 | 3.1 | 3.0 | 2.6 | 4.2 |
| | Screw revolution rate of extruder (rpm) | 30 | 30 | 30 | 30 | 30 | 30 | 30 | 30 | 30 | 30 | 30 |
| Exfoliation of molded article | | None | None | None | None | None | None | None | None | None | None | None |
| Number of spherulites in rod | | 10 | 11 | 10 | 24 | 26 | 19 | 7 | 7 | 6 | 6 | 19 |

TABLE 3

| | | Example-14 | Example-15 | Example-16 | Comparative Example-11 | Comparative Example-12 |
|---|---|---|---|---|---|---|
| Oxymethylene copolymer | A-1 | 100 | 100 | 100 | 100 | 100 |
| Hindered phenol | B-1 | 0.3 | 0.3 | 0.3 | 0.3 | 0.3 |
| | B-2 | | | | | |
| | B-3 | | | | | |
| Polyethylene | C-1 | 0.2 | 0.2 | 0.2 | 0.2 | 0.2 |
| | C-2 | | | | | |
| | C-3 | | | | | |
| | C-4 | | | | | |
| | C-5 | | | | | |
| | C-6 | | | | | |
| | C-7 | | | | | |
| | C-8 | | | | | |
| | C-9 | | | | | |
| | C-10 | | | | | |
| | C-11 | | | | | |
| Calcium salt of a fatty acid | D-1 | 0.05 | 0.05 | 0.05 | 0.05 | |
| | D-2 | | | | | |
| | D-3 | | | | | |
| | D-4 | | | | | |
| Formaldehyde-reactive substance | E-1 | 0.05 | | | | 0.05 |
| | E-2 | | 0.05 | | | |
| | E-3 | | | 0.05 | | |
| Others | F-1 | | | | 0.5 | 0.5 |
| | F-2 | | | | | 0.1 |
| Moldability for rod production | Size of void portion (mm) | 3.3 | 2.9 | 3.5 | 2.7 | 4.0 |
| | Degree of whitening | 2.9 | 2.9 | 3.2 | 2.4 | 1.8 |
| | Screw revolution rate of extruder (rpm) | 30 | 30 | 30 | 41 | 40 |
| Exfoliation of molded article | | None | None | None | None | None |
| Number of spherulites in rod | | 10 | 10 | 12 | 6 | 14 |

INDUSTRIAL APPLICABILITY

The oxymethylene polymer resin composition of the present invention is advantageous not only in that it has excellent extrusion moldability and exhibits excellent anti-slip properties when contacting the screw of an extruder during molding, but also in that an extrusion molded article produced therefrom has a remarkably reduced content of whitened portions and void portions comprising microvoids and hence has excellent mechanical properties and an excellent appearance.

What is claimed is:

1. An oxymethylene polymer resin composition comprising:
   (A) 100 parts by weight of an oxymethylene polymer,
   (B) 0.05 to 2 parts by weight of a sterically hindered phenol compound,
   (C) 0.01 to 5 parts by weight of a low-density polyethylene having a melt index of from 0.2 to 100 g/10 minutes,
   (D) 0.01 to 1.0 part by weight of a calcium salt of a fatty acid having 10 to 36 carbon atoms, wherein said calcium salt of the fatty acid has a calcium ion content of not larger than 50 ppm by weight and a chlorine ion content of not larger than 100 ppm by weight, and
   (E) 0 to 2.0 parts by weight of at least one formaldehyde-reactive substance selected from the group consisting of a non-polymeric compound ($E_1$) containing a formaldehyde-reactive nitrogen atom and a polymer ($E_2$) containing a formaldehyde-reactive nitrogen atom.

2. The resin composition according to claim 1, wherein said oxymethylene polymer (A) is at least one polymer selected from the group consisting of an oxymethylene copolymer, a branched oxymethylene copolymer and a block copolymer of an oxymethylene copolymer.

3. The resin composition according to claim 1 or 2, wherein said oxymethylene polymer (A) has a melt index of from 0.1 to 150 g/10 minutes.

4. The resin composition according to claim 1 or 2, wherein said hindered phenol compound (B) is at least one polymer selected from the group consisting of triethylene glycol-bis-[3-(3-t-butyl-5-methyl-4-hydroxyphenyl)-propionate], pentaerythrityl-tetrakis[3-(3,5-di-t-butyl-4-hydroxyphenyl)-propionate], N,N'-hexamethylene-bis(3,5-di-t-butyl-4-hydroxy-hydrocinnamide), 1,6-hexanediol-bis-[3-(3,5-di-t-butyl-4-hydroxyphenyl)-propionate], and 3,9-bis-[2-{-3-(3-t-butyl-4-hydroxy-5-methylphenyl)-propionyloxy}-1,1-dimethylethyl]-2,4,8,10-tetraoxaspiro(5,5)undecane.

5. The resin composition according to claim 1 or 2, wherein said hindered phenol compound (B) is present in an amount of from 0.1 to 1.0 part by weight, relative to 100 parts by weight of component (A).

6. The resin composition according to claim 1 or 2, wherein said low-density polyethylene (C) is at least one polyethylene selected from the group consisting of a high pressure low-density polyethylene and a linear low-density polyethylene.

7. The resin composition according to claim 6, wherein said high pressure low-density polyethylene has a density of from 0.91 to 0.93 g/cm$^3$ and said linear low-density polyethylene has a density of from 0.88 to 0.93 g/cm$^3$.

8. The resin composition according to claim 1 or 2, wherein said low-density polyethylene (C) has a melt index of from 0.2 to 100 g/10 minutes.

9. The resin composition according to claim 1 or 2, wherein said low-density polyethylene (C) is present in an amount of from 0.01 to 3.0 parts by weight, relative to 100 parts by weight of component (A).

10. The resin composition according to claim 1 or 2, wherein said low-density polyethylene (C) is a high pressure low-density polyethylene.

11. The resin composition according to claim 1 or 2, wherein said calcium salt of fatty acid (D) is at least one calcium salt selected from the group consisting of calcium laurate, calcium stearate and acid calcium behenate.

12. The resin composition according to claim 1 or 2, wherein said calcium salt of fatty acid (D) is present in an amount of from 0.02 to 0.5 part by weight, relative to 100 parts by weight of component (A).

13. The resin composition according to claim 1 or 2, wherein:

said non-polymeric compound ($E_1$) containing a formaldehyde-reactive nitrogen atom is at least one compound selected from the group consisting of dicyandiamide and an amino-substituted triazine compound, and said polymer ($E_2$) containing a formaldehyde-reactive nitrogen atom is at least one polymer selected from the group consisting of an amino-substituted triazine compound/formaldehyde polymer, a polyamide resin and an acrylamide polymer.

14. The resin composition according to claim 13, wherein said amino-substituted triazine compound is melamine; said amino-substituted triazine compound/formaldehyde polymer is a melamine/formaldehyde polymer; and said acrylamide polymer is at least one polymer selected from the group consisting of a poly-β-alanine and a polyacrylamide.

15. The resin composition according to claim 1 or 2, wherein said formaldehyde-reactive substance (E) is present in an amount of from 0 to 1.0 part by weight, relative to 100 parts by weight of component (A).

16. An extrusion molded article obtained from the resin composition of claim 1, which is a rod or a sheet.

17. A shaped article obtained by cutting the extrusion molded article of claim 16.

* * * * *